United States Patent [19]

Kunkel et al.

[11] Patent Number: 4,819,486
[45] Date of Patent: Apr. 11, 1989

[54] OPTOELECTRONIC ACCELEROMETER

[75] Inventors: Bernd Kunkel, Kirchheim; Karl Keller, Munich; Reinhold Lutz, Bernhaupten, all of Fed. Rep. of Germany

[73] Assignee: Messerschmitt-Bölkowe-Blohm GmbH, Munich, Fed. Rep. of Germany

[21] Appl. No.: 21,088

[22] Filed: Mar. 3, 1987

[30] Foreign Application Priority Data

Mar. 3, 1986 [DE] Fed. Rep. of Germany ....... 3606875

[51] Int. Cl.$^4$ .................. G01P 15/08; G01V 7/02
[52] U.S. Cl. .................. 73/382 R; 73/517 R
[58] Field of Search ............. 73/517 R, 517 B, 382 R

[56] References Cited

U.S. PATENT DOCUMENTS

| | | | |
|---|---|---|---|
| 2,331,904 | 10/1943 | Gustafsson et al. | 73/382 R |
| 3,664,196 | 5/1972 | Codina | 73/517 B |
| 3,713,343 | 1/1973 | Segerdahl et al. | 73/517 R |
| 4,315,433 | 2/1982 | Edelman et al. | 73/517 R |

*Primary Examiner*—John Chapman
*Attorney, Agent, or Firm*—Kenyon & Kenyon

[57] ABSTRACT

A device for acceleration measurements and, in particular, for gravitational field measurements in, for example, earth orbits, which has a body arranged movably in a force field, the position of which can be detected by a position location device. The force acting upon the body is anisotropic and, at least in the direction of the acceleration to be determined, is not a linear function of the deflection of the body from its resting position. In a preferred further development the body is suspended by four tension springs, which in the resting position of the body are arranged in a plane perpendicular to the direction of the acceleration to be determined, and which each form right angles with the adjacent spring. With 3 separate optoelectronic position detector receivers plus corresponding illuminators which provides some measurement redundancy, all acceleration planes can be measured with a great dynamic range. In the main direction, forces as small as $10^{-12}$ g will be measurable. With the position detectors, the device is much simpler and more compact than interferometric devices at equal precision. Other embodiments are described.

22 Claims, 4 Drawing Sheets

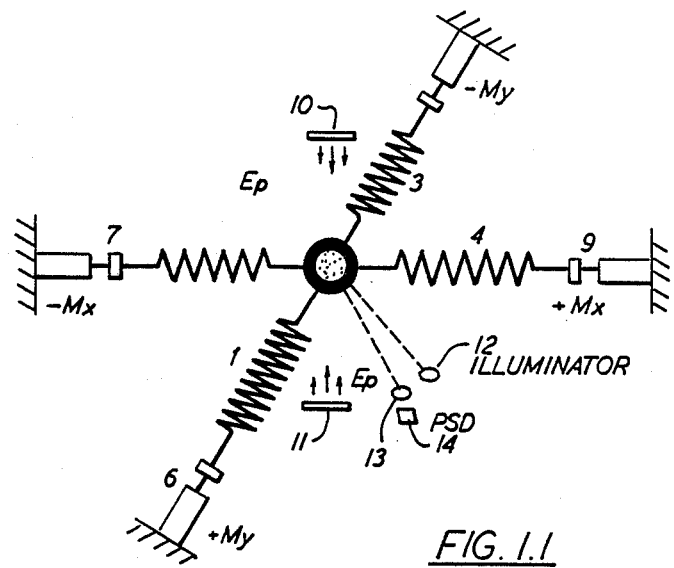
FIG. 1.1
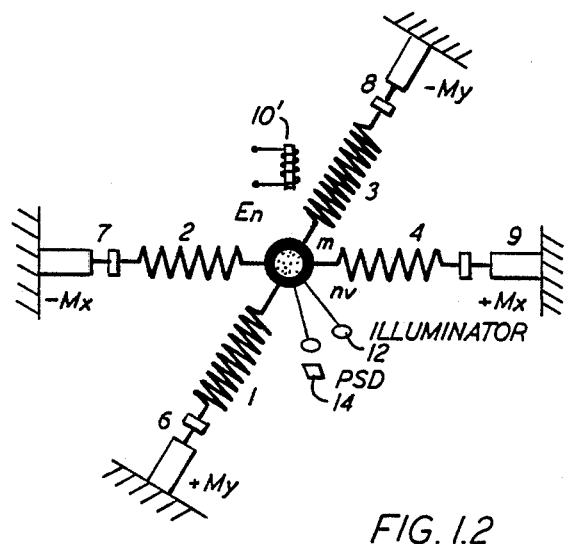
FIG. 1.2

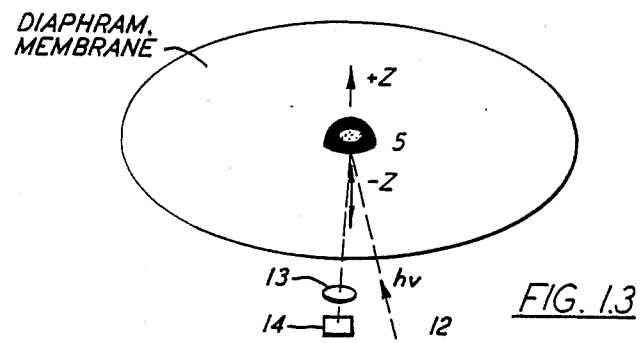
FIG. 1.3
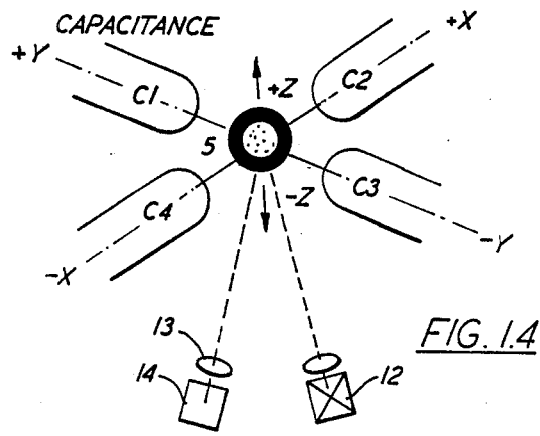
FIG. 1.4
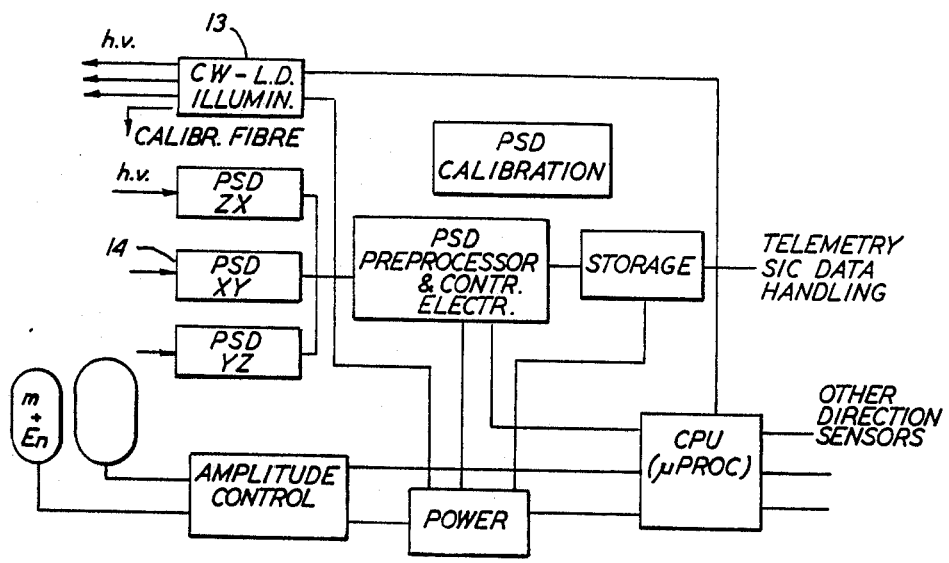
FIG. 2

OPTOELECTRONIC ACCELEROMETER

BACKGROUND OF THE INVENTION

The present invention relates to a device for acceleration measurements and in particular for gravitational field measurements in, for example, satellites.

A device for highly accurate acceleration measurements is known, for example, from U.S. Pat. No. 4,384,487. In this known device, the acceleration of a charged body is measured in an homogeneous electric field, which is generated by six electrodes assigned to each other in pairs. In order to be able to resolve changes in the gravitational field in the range of $10^{-10}$ g, in the device known from U.S. Pat. No. 4,384,487, the position of the body at any given time is measured interferometrically.

This known device has thus a number of disadvantages:

For example, a position location device which uses three interferometers, is not only very expensive, it also has high space requirements and must be precisely adjusted. These requirements alone make it appear doubtful that with the known device the desired precision can be achieved in an orbit around the earth, into which the device has been transported by a rocket or a space shuttle.

In addition, the force field, in which the "measuring body" is suspended, is in the known device generated by electric fields. The known device has thus a relatively high energy requirement, which is likewise a disadvantage in spacecraft.

A device of a different type for acceleration measurements is known from the article "A Supersensitive Accelerometer for Spacecraft Gradiometry" by V. S. Reinhardt et. al in the Proceedings of the IEEE Position Location and Navigation Symposium (1982).

SUMMARY OF THE INVENTION

It is an object of the present invention to provide a highly accurate device for acceleration measurements, which has high resolution over a wide dynamic range and which is especially suitable for use in spacecraft, i.e., has low space and energy requirements, for example.

The present invention provides means to accomplish the above and other objects. According to the invention, a reference body, the inert mass of which is accelerated, is arranged in an anisotropic and nonlinear force field extending in one direction; by that is meant, that the force acting upon the body is not a linear function of the deflection of the body from its resting position. Because of this nonlinear function, it is possible to create the force field in the area of the resting position of the body so that it is "very soft" and in the case of higher acceleration forces and thus greater deflection off the resting position increasingly "harder". With these steps, high deflections in the area of the resting position of the body at a given acceleration are obtained without making the entire system unstable due to deflections of too great an extent.

The concept according to the invention permits, for example, suspension of the body by four tension springs, which in the resting position of the body are arranged in a plane perpendicular to the direction of the acceleration to be determined, and which form a right angle with each other. In such an arrangement, small deflections of the body from its resting position in the direction of acceleration result in a force, which is a linear and third order function of the deflection of the body in the direction of acceleration. The linear force components can, for example, be compensated by applying an additional controllable force acting on the body, which is a linear function of the deflection of the body. Thus, the "net force" acting on the body becomes a third order function of the deflection from the resting position.

Further embodiments are also described for the generation of the inhomogeneous and "nonlinear" force field used in accordance with the invention: for instance, the force field can be generated by embedding the body as a sphere in a diaphragm. Moreover, it is possible, to generate the force field by arranging a dielectric or charged sphere in a heterogeneous repulsive electric field, which is generated by point poles lying in a plane, or by arranging a paramagnetic or diamagnetic rod with inhomogeneous mass distribution between poles magnetic in a plane.

FIG. 4 shows the embodiment using the paramagnetic or diamagnetic rod.

Embodiments for generating a controllable force which acts additionally on the body in the direction of acceleration, are also described.

The force, for example, can be an electrostatic or an electromagnetic force; it can, however, also be generated by radiation pressure (light beam, X-ray) or pneumatically, for example, by a directed gas jet.

FIGS. 5 and 6 show the use of a laser for applying radiation pressure and a gas jet for applying pneumatic pressure, respectively.

The device according to the invention has in every case the advantage that it permits determining the position of the body serving as reference mass in various ways:

It is, for example, possible to use the body as a retroreflector and to determine its position not only with interferometric measuring processes known per se, but also with a semiconductor position detector. When using a semiconductor detector in a device in accordance with the invention, a resolution of $10^{-12}$ g is obtained, if the position detector can resolve $10^{-6}$ m, which has been proven.

It is furthermore possible to determine the position of the body in an inductive or a capacitive measuring process or also through the variation of a resonator frequency.

Different embodiments are also described for designing the inhomogeneous weak linear force field adjustably.

The device according to the invention can be operated in a variety of operational modes: For example, the free motion of the body can be determined, the body adjusted to the desired position (deflection approximately equal to zero) or be set into periodic motion in the direction of acceleration. It is moreover possible, to measure the oscillation frequency with which the body oscillates.

Of course, a combination of these measuring processes is also conceivable.

BRIEF DESCRIPTION OF THE DRAWING

The present invention is explained in greater detail in conjunction with embodiments described with reference to the drawing figures in which:

FIG. 1.1 shows one embodiment of the apparatus according to the invention where the reference mass is suspended by springs with piezoelectrical pretension control perpendicular to the main measurement direction with an electrostatic field used for amplitude control;

FIG. 1.2 shows another embodiment which differs from that show in FIG. 1.1 in that an electromagnetic field is used for amplitude control;

FIG. 1.3 shows an accelerometer with the reference mass embedded in a diaphragm and with a position detector for measuring acceleration in one direction only;

FIG. 1.4 shows an accelerometer with the reference mass suspended by either electrostatic, electromagnetic, or magnetic forces, where acceleration induced deviation is detected by an optoelectronic position detector;

FIG. 2 shows an accelerometer block diagram; and

DETAILED DESCRIPTION

Figure 3:
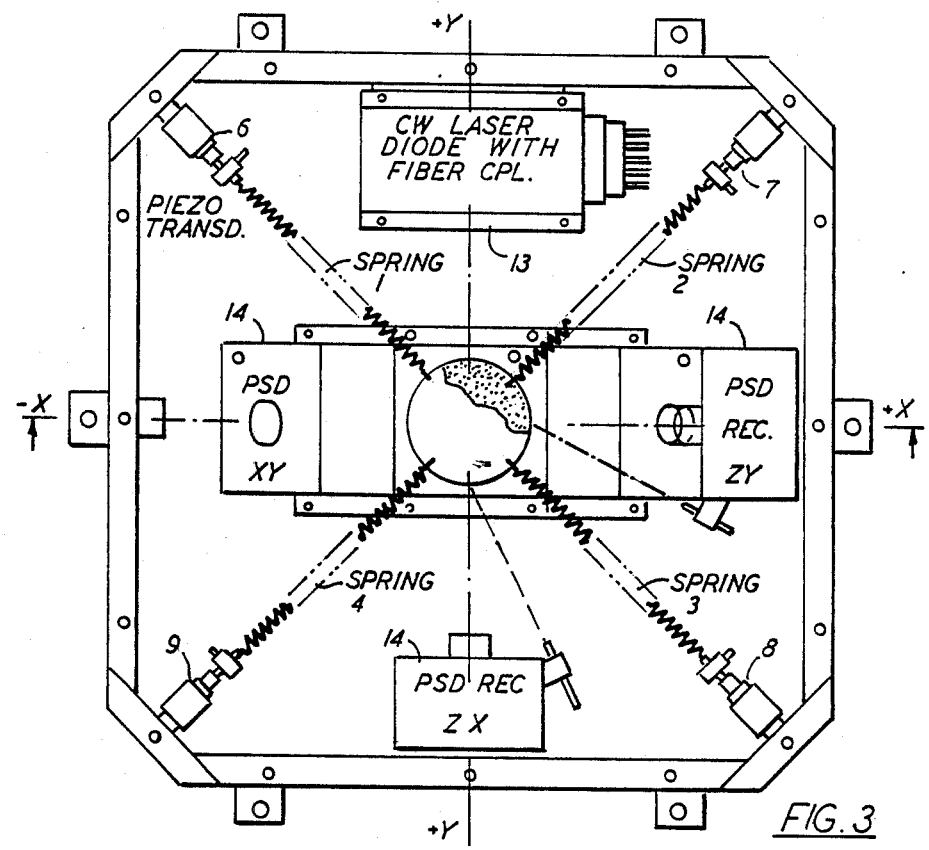
FIG. 3 shows a 3-plane arrangement with 3 position detector receivers.
Figure 4:
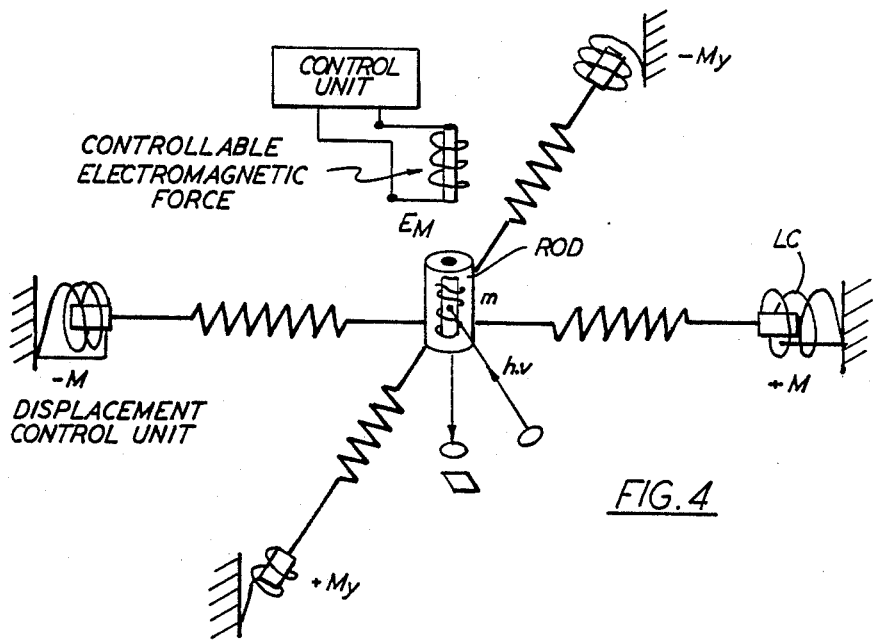
FIG. 4 shows an embodiment of the present invention utilizing a paramagnetic or diamagnetic rod as the body.
Figure 5:
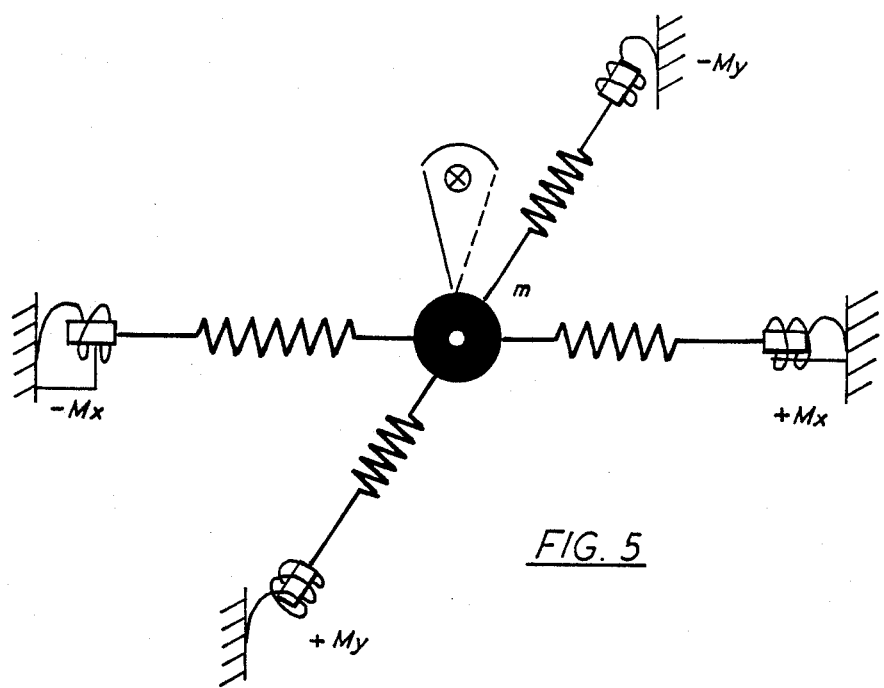
FIG. 5 shows an embodiment of the present invention wherein the means for applying the anisotropic force is a radiation pressure means.
Figure 6:
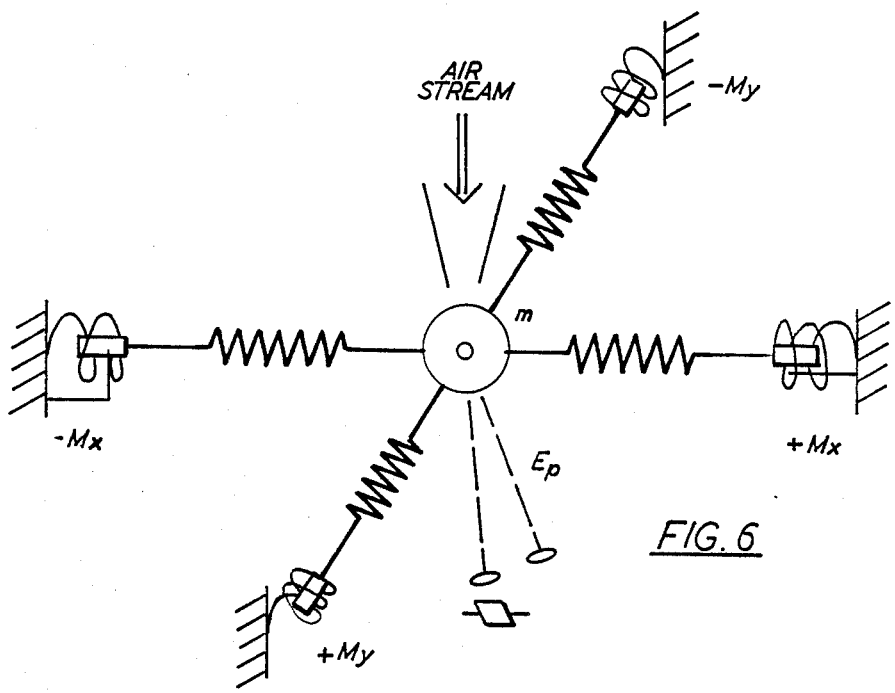
FIG. 6 shows an embodiments of the present invention wherein the means for applying the anisotropic force is a pneumatic means.

With reference to the drawings, four springs 1 ... 4 arranged in the x-y plane are connected to a body 5 of mass m and also with adjusting elements 6 ... 9. The adjusting elements 6 ... 9 serve for adjusting the linkage points of the springs and can be, for example, micrometer screws, piezoelements or magnetic coils. By adjusting the linkage points of the springs with the adjusting elements 6 to 9, possible imbalances of the spring tension acting upon the body, caused, for example, by process tolerances, temperature gradients etc. can be minimized, if not practically brought to zero.

Furthermore, two electrodes 10 and 11 are provided, which generate an electric field Ep with a component in the z direction, which likewise acts upon the body, or alternately, a magnetic coil 10' (FIG. 1.2)

The body is built as a retroreflector for momentary position location and is illuminated by a light source 12. The light reflected from the body 3 is reproduced by a lens 13 on a semiconductor position detector 14 (PSD), shown only schematically, the output signals of which determine the position of the reflected light point in the x and y directions.

A control unit, as shown in FIG. 2, is furthermore provided, which evaluates the output signals of the position detector, and, among other things, regulates the strength of the electric field Ep.

With this arrangement, an equilibrium of forces in the z direction is achieved, if the body 5 is deflected by $\Delta z$ by the acceleration to be determined from its resting position, which not only is a linear function of $\Delta z$ but also a third order function of $\Delta z$. The linear term can be practically completely compensated by appropriate regulation of the force generated by the electric field Ep, so that the force field, in which the body moves, is only a third order function of $\Delta z$.

With an optic position detector, which resolves the location of the body to $10^{-7}$ m, and spring constants k of approximately $10^8$ N/m, a spring length of approximately $10^{-2}$ m, and a mass of the body of approximately $2 \times 10^{-1}$ kg, one thus obtains a theoretical resolution of approximately $10^{-13}$ g. Further, the eigenfrequencies of the system are in the range of several hundred hertz and thus in a technically favorable range. Besides the acceleration measurement in the Z direction (the gravity component in a satellite borne instrument), the setup as indicated in FIG. 2 can measure deviations in the other planes as well if, as proposed, 3 position sensitive detectors and corresponding illuminators are used (e.g. fiber-split CW laser diode), i.e. deviations in the ZX-, YZ- and XY-planes. Thus, also disturbing forces in the X-direction (e.g. atmospheric drag) or XY-direction or others (e.g. solar pressure variations) can be measured simultaneously.

For this purpose it is advantageous that the setup with spring suspension provides a higher mechanical resistance in the direction of such perturbations, i.e. a smaller deflection. Accordingly, acceleration forces in the $10^{-5}$ g range are measured if they react in other than the Z-direction. An example for such an arrangement is shown in FIG. 3.

It should further be noted that deflections in the perpendicular plane have to be measured to improve the practically achievable sensitivity, which amounts to, due to the currently achieved position sensitive detector resolution, about $10^{-12}$ g.

In the above, the invention has been explained on the basis of an illustrated embodiment; within the framework of the general inventive concept, various modifications are, of course, possible:

It is, for example, possible to replace the semiconductor position detector with another position location system. Use of a semiconductor position detector is, however, preferred for reasons of resolution and space.

Displacing the linkage points of the springs can occur in any number of ways. Moreover, it is also possible to dispense with the displacement and to measure the length of the springs, for example, by current passage through the springs.

The control unit, which calculates the acceleration on the basis of the output signals of the position detector, can also regulate the electric field to operate the device described above in a particular operating mode, for example, to bring the body 5 into its resting position through variations of the electric field. In all cases, the control unit has preferentially a microprocessor.

In the foregoing specification, the invention has been described with reference to specific exemplary embodiments thereof. It will, however, be evident that various modifications and changes may be made thereunto without departing from the broader spirit and scope of the invention as set forth in the appended claims. The specifications and drawing are, accordingly, to be regarded in an illustrative rather than in a restrictive sense.

What is claimed is:

1. A device for acceleration measurements of a body along all three axes of motion and, in particular, for gravitational field measurements of a body in earth orbits, comprising means for both movably holding the body within a force field and applying an anisotropic force to the body, said force being, at least in a direction of the acceleration to be determined, a nonlinear function of the deflection of the body from its resting position, said non-linear function having a linear term, and further comprising, position detector means for detecting the location of the body and means for applying a controllable force to act on the body in one direction of acceleration to substantially cancel the linear term of said anisotropic force.

2. The device recited in claim 1, wherein said means for holding and applying comprises four tension springs which in the resting position of the body are arranged in a plane perpendicular to the main direction of the acceleration to be determined and form a right angle with each adjacent spring.

3. The device recited in claim 1, wherein the body is a sphere embedded in a diaphragm.

4. The device recited in claim 1, wherein the body is a dielectric or a charged sphere, which is in an inhomogeneous repulsive electric field, which generates punctiform poles lying in a plane.

5. The device recited in claim 1, wherein the body is a paramagnetic or diamagnetic rod with inhomogeneous mass distribution, arranged between magnetic poles lying in a plane.

6. The device recited in claim 1, wherein the means for applying a controllable force comprises means for applying an electrostatic force.

7. The device recited in claim 1, wherein the means for applying a controllable force comprises means for applying an electromagnetic force.

8. The device recited in claim 1, wherein the means for applying a controllable force comprises means for applying radiation pressure produced by a light beam.

9. The device recited in claim 1, wherein the means for applying a controllable force comprises means for applying pneumatic force produced by a gas jet.

10. The device recited in claim 1, wherein the position detector means has a light source which illuminates the body, said body comprising a retroreflector, and a semiconductor position detector, which detects the position of the reflected light beam in two dimension.

11. The device recited in claim 1, wherein the position detector means comprises a light source, which illuminates the body, said body comprising a retroreflector, and an interferometer, which determines the position of the body interferometrically.

12. The device recited in claim 1, wherein the position detector means detects the position of the body capacitively.

13. The device recited in claim 1, wherein the position detector means detects the position of the body inductively.

14. The device recited in claim 1, wherein the means for both movably holding the body and applying an anisotropic force to the body is adjustable.

15. The device recited in claim 2, wherein the means for holding and applying is adjustable and the suspension points of the springs are adjustable.

16. The device recited in claim 15, wherein longitudinal changes of the location of the suspension points can be provided with one of a linear motor, a micrometer screw, a piezoelectric crystal or a current-carrying coil.

17. The device recited in claim 15, further comprising means for controlling the length of the springs by current passage therethrough or specific temperature changes.

18. The device recited in claim 15, wherein the suspension points of the springs are hydraulically adjustable.

19. The device recited in claim 1, wherein the body moves in a suspension system.

20. The device recited in claim 6, wherein the body is controlled with respect to its resting position.

21. The device recited in claim 6, further comprising means for providing a periodic motion in the direction of acceleration.

22. The device recited in claim 1, further comprising means for changing the anisotropic force periodically.

* * * * *